United States Patent [19]

Naruki et al.

[11] Patent Number: 4,712,145
[45] Date of Patent: Dec. 8, 1987

[54] OPERATING MECHANISM FOR SMALL PORTABLE CASSETTE TAPE PLAYER

[75] Inventors: Toshimasa Naruki, Fukushima; Toshihisa Goto, Tokyo, both of Japan

[73] Assignee: Mitsubishi Denki Kabushiki Kaisha, Tokyo, Japan

[21] Appl. No.: 886,124

[22] Filed: Jul. 16, 1986

Related U.S. Application Data

[63] Continuation of Ser. No. 705,933, Feb. 26, 1985, abandoned.

[30] Foreign Application Priority Data

| Mar. 1, 1984 | [JP] | Japan | 59-28223[U] |
| Mar. 1, 1984 | [JP] | Japan | 59-28224[U] |
| Mar. 1, 1984 | [JP] | Japan | 59-28225[U] |
| Mar. 1, 1984 | [JP] | Japan | 59-28226[U] |
| Mar. 1, 1984 | [JP] | Japan | 59-28227[U] |

[51] Int. Cl.⁴ ............................................. G11B 15/00
[52] U.S. Cl. .................................... 360/96.5; 360/93; 360/137
[58] Field of Search ................. 360/96.3, 96.4, 96.5, 360/137, 93, 95

[56] References Cited

U.S. PATENT DOCUMENTS

| 4,208,023 | 6/1980 | Demol | 360/96.5 X |
| 4,479,155 | 10/1984 | Takai et al. | 360/96.5 |
| 4,561,031 | 12/1985 | Tanabe | 360/96.5 |
| 4,593,331 | 6/1986 | Tomita | 360/137 X |
| 4,620,246 | 10/1986 | Kato | 360/93 X |

Primary Examiner—John H. Wolff
Attorney, Agent, or Firm—Sughrue, Mion, Zinn, Macpeak and Seas

[57] ABSTRACT

An operating mechanism for a small portable cassette tape player/recorder which does not require separate operating buttons to play and record. Operation of the player is effected by pushing the cassette toward the recording/reproducing head. Playing/recording is stopped by pushing the cassette again. This push-push mechanism obviates the need for operating buttons, and decreases the size of the player.

3 Claims, 10 Drawing Figures

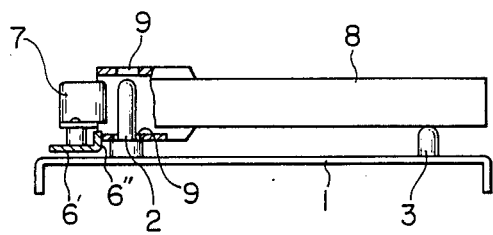
FIG. 5
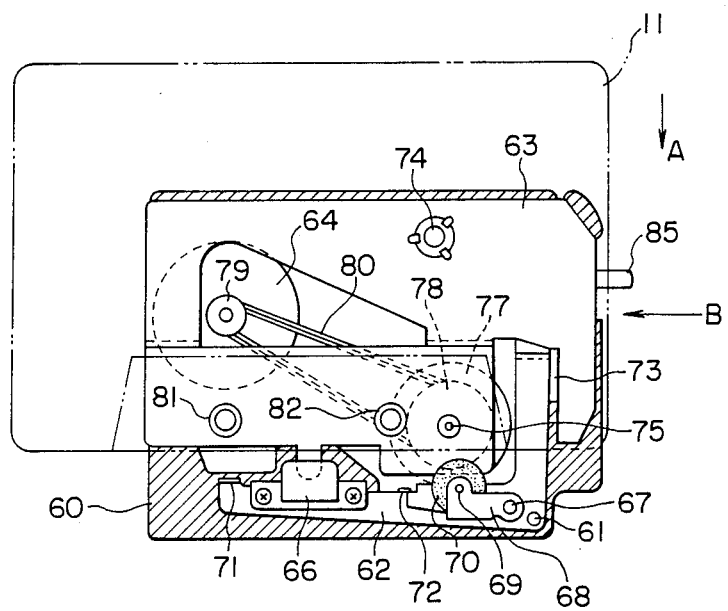
FIG. 6
FIG. 7
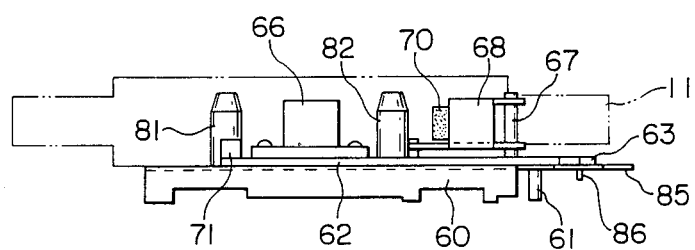

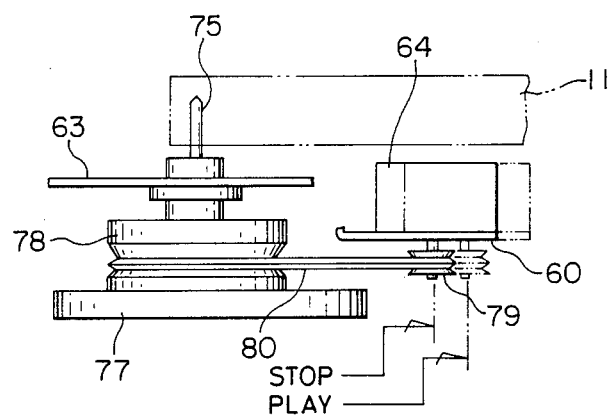

OPERATING MECHANISM FOR SMALL PORTABLE CASSETTE TAPE PLAYER

This is a continuation of application Ser. No. 705,933, filed Feb. 26, 1985, now abandoned.

BACKGROUND OF THE INVENTION

The present invention relates to a magnetic head position determining device for a cassette tape player.

A conventional magnetic head position determining device of the same general type to which the invention pertains is constructed as shown in FIG. 1. In FIG. 1, reference numeral 1 designates a substrate. A position determining pin 2 and a cassette holding stand 3 are secured to the substrate 1. A leaf spring 4 is also secured to the substrate 1 with a screw 5. Reference numeral 6 designates a head substrate which is movable in the horizontal plane with respect to the substrate 1. A head 7 is mounted on the head substrate 6. Reference numeral 8 designates a compact cassette.

FIG. 1 shows the cassette 8 loaded in the player. That is, the pin 2 is engaged with a position determining hole 9 formed in the cassette 8, the cassette is placed on the cassette holding stand 3, and the cassette is urged by the leaf spring 4 in a direction perpendicular to the axis of the pin 2. Thus, the position of the cassette 8 is determined with respect to the substrate 1.

The head substrate 6 is moved towards the cassette 8 thus loaded until the head substrate 6 abuts the pin 2 so that the position of the head 7 with respect to the substrate 1 is suitably determined while the head 7 abuts against the magnetic tape (not shown) in the cassette 8 and which is exposed through the front opening of the cassette 8.

In the conventional magnetic head position determining device, the position of the head 7 with respect to the cassette 8 is determined by the position of abutment of the head substrate 6 with the pin 2. Therefore, the device is disadvantageous in that the accuracy of the head position is not as high as desirable. Also, the above-described conventional cassette position regulating device suffers from a difficulty that it is intricate in construction because it requires the leaf spring 4 and the screw 5 for securing the leaf spring 4 to the substrate.

The invention further relates to an operating mechanism for a portable cassette tape player, and more particularly to an operating mechanism suitable for a small portable cassette tape player.

A conventional portable cassette tape player of this type is as shown in FIG. 2. In FIG. 2, reference numeral 11 designates a compact cassette; 12, a reproducing head (or a recording and reproducing head); 13, a mechanical body base; and 14a, 14b and 14c, operating buttons. The head 12 is mounted on a movable substrate 15. The movable substrate 15 is mounted on the mechanical body base 13 in such a manner that it can swing about a fulcrum 16. The operating buttons 14a, 14b and 14c are provided on one side of the mechanical body base 13. Further in FIG. 2, reference numeral 17 designates a pinch roller which is rotatably mounted on a pinch roller arm 18. The pinch roller arm 18 is mounted on the mechanical body base 13 in such a manner that it is swingable about a fulcrum 19. The arm 18 is urged clockwise by a spring or the like (not shown) so that its free end is abutted against a pin 20 fixed to the movable substrate 15. FIG. 2 shows the cassette 10 loaded in the player, but not the case, etc.

When, after the cassette 10 is loaded in the mechanical body base 13, the reproducing button 14a is depressed, the movable substrate 15 is turned counter-clockwise, as a result of which the reproducing head 12 is abutted against the magnetic tape (not shown) while the pin 20 is released from the arm 18. Therefore, the arm 18 is turned clockwise and the pinch roller 17 is pushed against a capstan 11, which is rotated at a constant speed. At the same time, a tape winding reel shaft (not shown) is rotated to wind the tape, and signals are reproduced from the tape.

The above-described portable cassette tape player is disadvantageous in that it is large in size because the operating buttons 14a, 14b and 14c protrude from the mechanical body base 13 (which is substantially equal in size to the frame (not shown) of the player).

Another aspect of the present invention relates to a drive mechanism for a cassette tape player, and more particularly to a drive mechanism using an endless belt laid over pulleys in a cassette tape player.

A conventional drive mechanism of the same general type as the invention is constructed as shown in FIG. 3. In FIG. 3, reference numeral 31 designates a cassette holding a magnetic tape; and 32 a base plate of a cassette tape player. A motor 33 is fixed to the plate 32, and a capstan 34 is rotatably mounted on the plate 32. On the rear side of the plate 32, a flywheel 35 is mounted on the capstan 34, and a pulley 36 is fixed to the shaft of the motor 33. The flywheel 35 includes an integrally formed pulley. A rubber endless belt 37 is laid over the pulley of the flywheel 35 and the pulley 36.

In the cassette tape player drive mechanism thus constructed, the motor 33 drives the capstan 34 so that the magnetic tape is run by the capstan 34. If, in the drive mechanism described above, the tension of the belt 37 is insufficient, it is difficult to transmit the torque of the motor to the capstan 34. Therefore, in general, the belt 37 must be kept under a relatively high tension. Since the belt 37 is kept under a high tension, the belt 37 tends to deteriorate with time, as a result of which the reproduced sound includes distortion due to wow and flutter.

Another conventional operating mechanism for a portable cassette tape player is shown in FIG. 4. In order to show the interior of the player well, the case, etc., are not shown in FIG. 4. The player shown in FIG. 4 is in its signal reproducing state.

In FIG. 4, reference numeral 41 designates a conventional compact cassette; and 42, a substrate on which a head substrate 43 is mounted in such a manner that it can move towards and away from a cassette 41. A reproducing (or recording and reproducing) head 44 is mounted on the head substrate 43. The head substrate 43 is urged by a mechanism (not shown) so as to move away from the loaded cassette 41, and normally it is abutted against a stop (not shown). Further in FIG. 4, reference numeral 45 designates a pinch roller arm on which a pinch roller 46 is rotatably supported. The arm 45 is rotatably mounted on a pin 47 fixed to the substrate 42. The arm 45 is urged clockwise by a mechanism (not shown) such that the end portion of the arm 45 is abutted against a raised part 48 of the head substrate 43. Levers 51 and 52, which have operating buttons 49 and 50, respectively, are mounted on the substrate 42 in such a manner that they are slidable in the direction of the arrow A. A tension spring 53 is connected between the lever 51 and the head substrate 43.

Further in FIG. 4, reference numeral 54 designates an arm which is rotatably mounted on a pin 55 fixed to the substrate 42 and is abutted against a raised part 43a of the head substrate 43 and a raised part 52a of the lever 52; 56a and 56b, reel shafts; 57, a capstan; and 58a and 58b, positioning pins. The reel shafts, the capstan and the positioning pins are engaged with the holes (not shown) of the cassette loaded in the player. The lever 52 extends through a hole 59 formed in the substrate 42.

In the portable cassette tape player thus constructed, by depressing the operating button 49 in the direction of the arrow A, the head substrate is moved through the spring 53 in the direction of the arrow A so that the head 44 is abutted against the magnetic tape in the cassette 41 loaded as shown in FIG. 4. When the head substrate 43 is moved as described above, its raised part 48 is also moved away from the arm 45, as a result of which the pinch roller 46 is abutted against the capstan 57 with the magnetic tape therebetween, and the magnetic tape is run. Thus, the player has been placed in the signal reproducing (or recording) state.

When, under this condition, the operating button 50 is pushed in the direction of the arrow A, the head substrate 43 is moved through the arm 54 in the direction opposite to the direction of the arrow A (against the elastic force of the spring 53). As a result, the head is moved away from the magnetic tape while the pinch roll 46 is moved away from the capstan 57. In this state, the magnetic tape is run at high speed; that is, in the fast forward mode.

As is apparent from the above description, the conventional portable cassette tape player operating mechanism requires the arm 54 to run the magnetic tape in the fast forward mode, and therefore it is disadvantageous in that it is intricate in construction.

SUMMARY OF THE INVENTION

An object of the invention is to eliminate the above-described difficulties accompanying a conventional head position determining device for a cassette tape player.

In accordance with the above and other objects, the invention provides a head position determining device for a cassette tape player comprising: a substrate, a pin fixed to the substrate for determining the position of a cassette loaded therein, a head substrate movably mounted with respect to the substrate, and a magnetic head mounted on the head substrate, in which the position of a cassette with respect to the substrate is determined by the pin when inserted into a positioning hole formed in the cassette, and the head substrate is moved towards the cassette so that the head is inserted into the cassette loaded therein through the front opening in which a magnetic tape is exposed and the head is abutted against the magnetic tape, in which, according to the invention, the head substrate has an abutting part which abuts against the front end of a cassette loaded therein when the head substrate is moved towards the cassette, whereby the position of the head with respect to the cassette is accurately determined.

Further, the invention provides a cassette position determining device for a cassette tape player comprising: a substrate, a position regulating pin fixed to the substrate, a head substrate movably mounted with respect to the substrate, and a magnetic head mounted on the head substrate, in which a cassette loaded therein is urged perpendicularly to the axis of the pin by inserting the pin into a position regulating hole formed in the cassette, thereby to appropriately determine the position of the cassette with respect to the substrate, and the head substrate is moved towards the cassette so that the head is inserted into the cassette through the front opening in which the magnetic tape is exposed and the head is abutted against the magnetic tape, in which, according to the invention, the head substrate has an abutting part which abuts against the front end of a cassette loaded therein when the head substrate is moved towards the cassette, thereby to urge the cassette in a direction perpendicular to the axis of the pin without a leaf spring.

Still further, provided according to the invention is an operating mechanism for a portable cassette tape player which comprises: a mechanism for receiving a cassette, a guiding mechanism for leading the cassette to a playing position by pushing the cassette towards the front end in which an opening for exposing the magnetic tape is formed, and a holding mechanism having a push-push mechanism for selectively holding the cassette at the playing position, in which, when the rear end of the cassette is pushed, the cassette is held at the playing position by the holding mechanism and the player is placed in a signal reproducing state, and when the rear end of the cassette is pushed again, the holding operation by the push-push mechanism is released, the cassette is shifted to a release position and the player is placed in a stopped state. Accordingly, the provision of the operating mechanism according to the invention makes it possible to eliminate operating buttons in designing the portable cassette tape player and to thus reduce the size of the player.

A further object of the invention is to eliminate the above-described difficulties accompanying a conventional cassette tape player driving mechanism.

In accordance with this object, the invention provides a driving mechanism for a magnetic tape player in which a driven pulley is driven through a belt by a driving pulley, in which, according to the invention, these pulleys are provided on two different substrates which are movable relative to each other, and the substrates are moved relative to each other in association with the reproduction or stop operation of the player so that the tension of the belt is increased in the reproduction operation of the player compared with that which is provided when the player is not in operation, whereby the torque of the motor is sufficiently transmitted to the capstan of the player while deterioration over time of the belt is minimized.

Yet further, the invention provides an operating mechanism for a portable cassette tape player which can run a magnetic tape in the fast forward mode without using the above-described arm and which is simple in construction.

BRIEF DESCRIPTION OF THE DRAWINGS

FIG. 5 is a side view outlining a head position determining device in a cassette tape player according to the invention;

FIG. 6 is a plan view showing the interior construction of a preferred embodiment of a portable cassette tape player according to the invention;

FIG. 7 is a front view of the player shown in FIG. 6;

FIG. 10 is an enlarged side view showing a driving mechanism in the player shown in FIG. 6.

DESCRIPTION OF THE PREFERRED EMBODIMENTS

Figure 1:
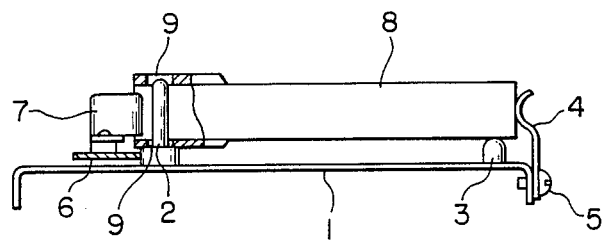
FIG. 1 is a side view outlining a conventional head position determining device in a cassette tape player.

A preferred embodiment of the invention will be described with reference to FIG. 5. In FIG. 5, those embodiments which have been previously described with reference to FIG. 5 are therefore designated by the same reference numerals. In FIG. 5, reference numeral 6′ designates a head substrate. The head 7 is mounted on the head substrate 6′. The head substrate 6′ is bent to form an abutting part 6″. The abutting part 6″ is arranged so that it can be abutted against the front end of the cassette 8 which has been loaded as described before.

When, in the head position regulating device thus constructed, the head substrate 6′ is moved in order to cause the head 7 to abut against the magnetic tape in the cassette 8, the abutting part 6″ is abutted against the front end of the cassette 8 so that the position of the head 7 with respect to the cassette is accurately determined. When the abutting part 6″ is abutted against the cassette 8, the latter is urged in a direction perpendicular to the axis of the pin 2 so that the cassette loaded (playback/record) position is determined. FIG. 5 shows the head 7 and the cassette where the positions thereof are properly determined.

As is apparent from the above description, in a cassette tape player of this embodiment of the invention having a substrate, a pin fixed to the substrate for determining the position of a cassette loaded therein, a head substrate movably mounted with respect to the substrate, and a magnetic head mounted on the head substrate, and in which the position of a cassette loaded therein with respect to the substrate is determined by a pin inserted into a position determining hole formed in the cassette and the head substrate is moved so that the head is inserted into the cassette through its front opening in which the magnetic tape is exposed and the head is abutted against the magnetic tape, the head substrate has an abutting part which abuts against the front end of the cassette loaded therein when the head substrate is moved as described above, whereby the position of the head with respect to the cassette is accurately determined. That is, in the head position determining device of the invention, the head substrate abuts directly against the cassette. The head position determining device of the invention can set the position of the cassette with respect to the head more accurately than the conventional head position determining device in which the head substrate is abutted against a pin to establish the position of the cassette with respect to the head. Also, the device of the invention, unlike the conventional device, needs no leaf spring to establish the position of the cassette loaded therein. Thus, the device of the invention is simpler in construction than the conventional device.

Figure 8:
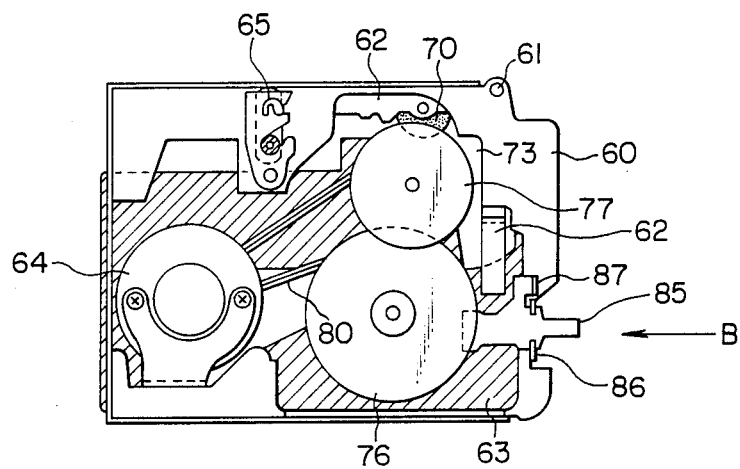
FIG. 8 is a bottom view of the player shown in FIG. 6.
Figure 9:
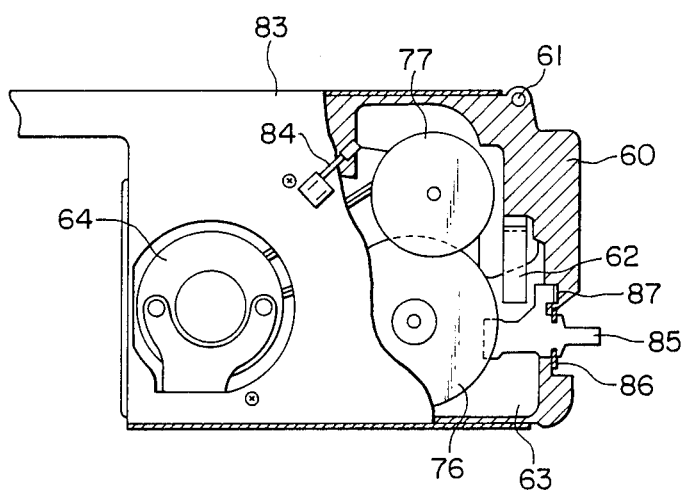
FIG. 9 is a bottom view of the player shown in FIG. 6 on which a printed circuit board is installed.

A further embodiment of the invention will be described with reference to FIGS. 6 through 10 of the accompanying drawings. FIG. 6 is a plan view of a portable cassette tape player from which the case, etc., have been removed to show the interior in detail. FIG. 7 is a front view of the player shown in FIG. 6. FIG. 8 is a bottom view of the player shown in FIG. 6. FIG. 9 is a bottom view of the player in FIG. 6, which has a printed circuit board.

In these figures, reference numeral 60 designates a stationary substrate (which is indicated in section in FIGS. 6 and 9 so that it can be readily distinguished from other components). A first movable substrate 62 is rotatably mounted on a pin 61 fixed to the stationary substrate 60. A second movable substrate 63 (indicated in section in FIG. 8) is mounted on the stationary substrate 60 in such a manner that it is slidable in the direction of the arrow A by a conventional slide mechanism (not shown). A tape driving motor 64 is fixed to the stationary substrate 60. A locking mechanism 65 (described below) is also provided on the stationary substrate 60. The locking mechanism 65 is conventional. By pushing the locking mechanism 65, the second movable substrate 63 is held at a predetermined movement position (described below) or removed from the position.

A reproducing (or recording) head 66 is mounted on the first movable substrate 62. A pinch roller arm 68 is rotatably mounted on a pin 67 fixed to the first movable substrate 62. A conventional pinch roller 70 is rotatably mounted on a pin 69 fixed to the pinch roller arm 68. The first movable substrate 62 has raised parts 71 and 72. The raised part 71 is pushed by a cassette 11 when loaded for a signal reproducing (or recording) operation. The pinch roller arm 68 provided on the first movable substrate 62 is urged clockwise (in FIG. 6) by a spring or the like (not shown) so that the end portion of the pinch roller arm is abutted against the raised part 62. The first movable substrate 62 is also urged clockwise (in FIG. 6) by a spring (not shown) so that it is abutted against a stop (not shown), that is, it is held as shown in FIG. 6.

The first movable substrate 62 is substantially L shaped, being composed of two arms which extend perpendicular to each other. A reproducing head (or recording and reproducing head) 66 is mounted on one of the arms. A pinch roller arm 68 is rotatably mounted on a pin 67. A conventional pinch roller 70 is rotatably mounted on a pin 69.

As shown in FIG. 8, a part of the first movable substrate 62 extends through a cut 73 of the stationary substrate 60 to the rear surface of the second movable substrate 63, thus forming the other of the above-mentioned two arms. A conventional winding reel shaft 74 and a conventional capstan 75 are rotatably provided on the second movable substrate 63. On the rear surface of the second movable substrate 63, a drum 76 and a flywheel 77 are fixedly mounted on the reel shaft 74 and the capstan 75, respectively. A rubber endless belt 80 is laid over the small-diameter part of the flywheel 77 and the pulley 79 mounted on the shaft of the motor 74 so that the capstan 75 is driven by the motor. The rotation of the flywheel 77 is transmitted through an idler (not shown) to the reel shaft 74 so that the reel shaft is also driven by the motor 64.

Further in the figures, reference numerals 81 and 82 designate positioning pins fixed to the second movable substrate 63. The positioning pins 81 and 82 are engaged with the positioning holes (not shown) of the cassette 11 set on the second movable substrate 63 so that the cassette 11 is positioned with respect to the second movable substrate 63. Reference numeral 83 designates a printed circuit board having a suitable electronic circuit. A leaf switch 84 is installed on the printed circuit board 83. An operating piece 85 is slidably mounted on a raised part 86 of the stationary substrate 60 and is urged in the rightward direction in the figure. The operating piece 85 has a raised part 87 which can be abutted against the above-described extension of the first movable substrate 62. The second movable substrate 63 is urged upwardly (in FIG. 6) by a suitable spring (not shown) and is abutted against a stop (not shown) so that it is held as shown in FIG. 6.

The operation of the portable cassette tape player thus constructed will be described.

Under the condition shown in FIG. 6, the cassette 11 is placed on the second movable substrate 63 in such a manner that the holes of the cassette are engaged with the reel shaft 74, the capstan 75 and the pins 81 and 82. Thereafter, the operator pushes the cassette 11 in the direction of the arrow A. Accordingly, the cassette 11 and the second movable substrate 63 are moved in the direction of the arrow A. As a result, the head 86 and the pinch roller 70 are inserted into the front opening (not shown) of the cassette, thus abutting against the magnetic tape (not shown) in the cassette. At the same time, the pulley 79 is moved to the position indicated by the broken lines in FIG. 10, thus increasing the tension of the belt 80. By further pushing the cassette in the direction of the arrow A, the front end of the cassette 11 is abutted against the raised part 71 of the first movable substrate 62 so that the first movable substrate 62 is turned about the pin 61; that is, the cassette 11 is moved a substantially constant distance between the cassette 11 and the head 66 and the pinch roller 70. As a result, the pinch roller 70 is abutted against the capstan 75 through the magnetic tape. As the cassette is further moved, the pinch roller 70 is pushed by the capstan 75. Therefore, the arm 68 is moved away from the raised part 72 of the first movable substrate 62 and the magnetic tape is pushed against the capstan 75 by the substantially constant force of energization of the arm 68.

As the cassette 11 is further pushed in the direction of the arrow A, the second movable substrate 63 is held by the locking mechanism 65, and the magnetic tape in the cassette 11 is abutted against the head 66 while the pinch roller 70 is maintained abutted through the magnetic tape against the capstan 75. Immediately before the second movable substrate 63 is held at its predetermined position as described above, the leaf switch 84 is turned by the protrusion (not shown) of the movable substrate, thus applying drive current to the motor 64. That is, when the second movable substrate 63 has been held as described above, the drive current is applied to the motor 64.

The rotation of the motor 64 is transmitted through the belt 80 to the capstan 75 to rotate the latter, and the rotation of the capstan is transmitted through the idler to the reel shaft 74. As the capstan is rotated, the magnetic tape pushed against the pinch roller 70 is run in the conventional manner and wound on a hub (not shown) rotated by the reel shaft 74. As the head 66 is maintained in contact with the magnetic tape thus run, the signals recorded therein can be reproduced or recorded.

Figure 2:
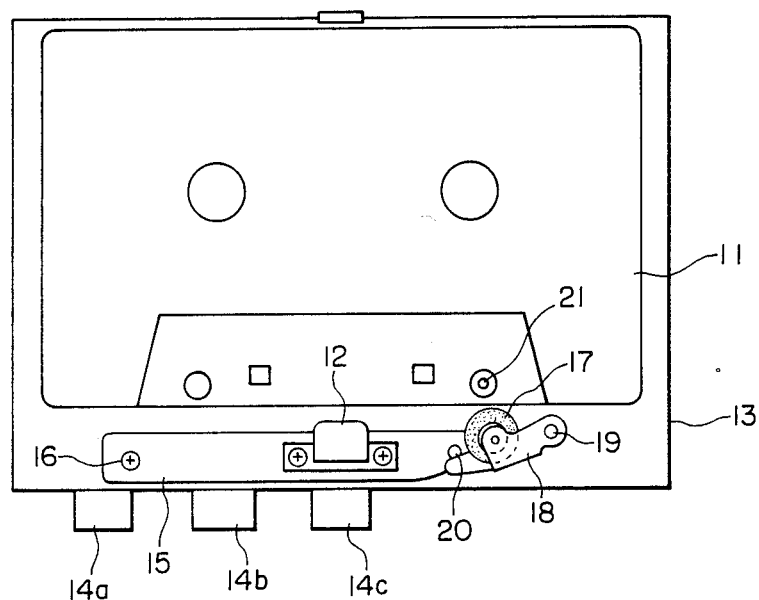
FIG. 2 is a plan view showing the interior construction of a conventional portable cassette tape player.
Figure 3:
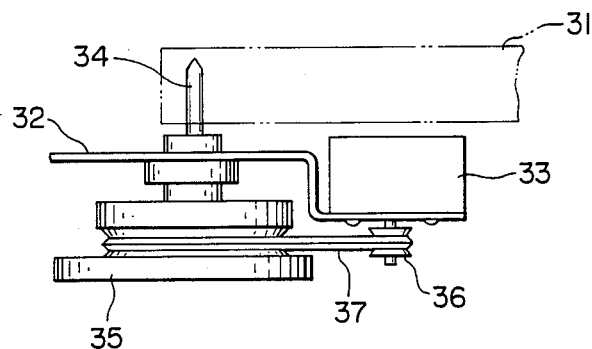
FIG. 3 is a plan view outlining a conventional driving mechanism in a cassette tape player.
Figure 4:
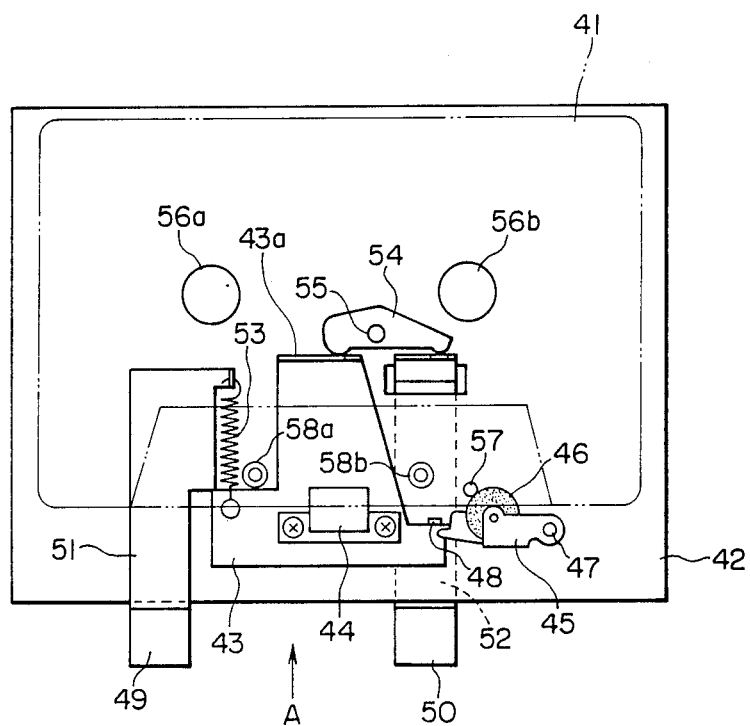
FIG. 4 is a plan view further illustrating the interior construction of a conventional portable cassette tape player.

When, in this signal reproducing or recording state, the cassette 11 is depressed in the direction of the arrow A again, the second movable substrate 63 is released from the locking mechanism so that the cassette 11 is restored as shown in FIG. 2 and held stopped. Under this condition, the leaf switch 84 is turned off, as a result of which the reel shaft 74 and the capstan 75 are stopped while the head 66 and the pinch roller 70 are moved away from the magnetic tape, whereupon the tension of the belt 80 is released.

If, in the signal reproducing or recording state, the operation piece 85 is moved in the direction of the arrow B, the extension of the first movable substrate 62 is pushed by the raised part 87 of the operating piece 85. As a result, the first movable substrate 62 is turned counterclockwise in FIG. 6 so that the head 66 and the pinch roller 70 are moved away from the magnetic tape, i.e., the magnetic tape becomes free from the head 66 and the pinch roller 70 (or the capstan 75). Since, under this condition, the reel shaft 74 is driven by the motor 64, the magnetic tape can be run at high speed, that, it is run in the fast forward mode.

In the above-described embodiment, the first movable substrate 62 is mounted on the pin 61 and the pinch roller arm 68 is mounted on the pin 67; however, the first movable substrate 62 and the pinch roller arm 68 may be mounted on the same pin.

As is apparent from the above description, the portable cassette tape player according to the invention includes a cassette receiving mechanism including the second movable substrate and the pins fixed to the substrate, the cassette guiding mechanism made up of the slide mechanism including the second movable substrate, etc., for guiding the cassette to the play/record position by pushing the cassette towards the front end where an opening for exposing the magnetic tape is formed, and the holding mechanism including the locking mechanism with the push-push mechanism for selectively holding the cassette at the play/record position.

In the portable cassette tape player thus constructed, by pushing the rear end of the cassette, the cassette is held at the play/record position by the holding mechanism and the player is placed in the signal reproducing state, and by pushing the rear end of the cassette again, the cassette is released from the holding mechanism so that it is shifted to the unloaded position and the player is placed in the stopped state. Thus, the player can be placed selectively in the signal reproducing or recording state or in the stopped state by pushing the cassette. Accordingly, the portable cassette tape player of the invention, unlike the conventional player, requires no operating buttons and no mechanisms related to operating buttons, and thus is extremely small in size.

Moreover, as is apparent from the above description, in the cassette tape player of the invention in which the pulley on the driven side (the small-diameter part of the flywheel) is driven through the belt by the pulley on the driving side, the pulley on the driving side and the pulley on the driven side are provided on different substrates which are movable relative to each other, and the substrates are moved relative to each other in association with the playback or stopped operation of the player so that the tension of the belt is increased in the playback operation compared with that when the player is in the stopped state. Accordingly, with the driving mechanism of the invention, compared with the conventional mechanism, the torque of the motor can be sufficiently transmitted to the capstan and the deterioration over time of the belt significantly reduced.

We claim:

1. An operating mechanism for a portable cassette tape player, comprising:

receiving means for receiving a cassette, including a first movable substrate on which at least a reproducing head of said cassette tape player is mounted;

guiding means for guiding said cassette to a loaded position by pushing said cassette towards a front end of said portable cassette tape player in which an opening for exposing a magnetic tape is formed, said guiding means including a second movable substrate; and holding means for selectively holding said cassette at said loaded position and releasing said cassette from said loaded position wherein:

when a rear end of said cassette is pushed a first time, said cassette is guided to and held at said loaded position by said guiding means and said holding means, respectively, said second movable substrate being moved toward said first movable substrate, and said portable cassette tape player is placed in a signal reproducing state, and when said rear end of said cassette is pushed a second time, said cassette is released from said loaded position and is shifted to a nonloaded position, said second movable substrate being moved away from said first movable substrate and said portable cassette tape player is placed in a stop state, and wherein said holding means operates in a push-push manner without operating buttons for initiating and terminating a playing operation.

2. The operating mechanism as claimed in claim 1, wherein said receiving means comprises a plurality of positioning pins, a capstan and reel shaft with which respective engaging holes of said cassette are engaged.

3. The operating mechanism as claimed in claim 1, further including means for turning said first movable substrate away from said second movable substrate when said portable cassette tape player is in said signal producing state, wherein said head is moved away from magnetic tape within said cassette, for placing said portable cassette tape player in condition for a fast forward operation.

* * * * *